United States Patent [19]

Saukkonen

[11] Patent Number: 6,011,590
[45] Date of Patent: Jan. 4, 2000

[54] METHOD OF TRANSMITTING COMPRESSED INFORMATION TO MINIMIZE BUFFER SPACE

[75] Inventor: Jukka I. Saukkonen, San Diego, Calif.

[73] Assignee: NCR Corporation, Dayton, Ohio

[21] Appl. No.: 08/778,929

[22] Filed: Jan. 3, 1997

[51] Int. Cl.[7] .................................................. H04N 7/30
[52] U.S. Cl. .............................. 348/419; 348/17; 395/114
[58] Field of Search ..................................... 348/419, 716, 348/423, 17, 7, 845, 845.2; 395/500, 200.76, 200.79, 114; H04N 7/30

[56] References Cited

U.S. PATENT DOCUMENTS

| | | | |
|---|---|---|---|
| 5,510,844 | 4/1996 | Cash et al. | 348/465 |
| 5,515,377 | 5/1996 | Horne et al. | 370/94.1 |
| 5,666,161 | 9/1997 | Kohiyama et al. | 348/408 |
| 5,666,487 | 9/1997 | Goodman et al. | 395/200.76 |
| 5,675,384 | 10/1997 | Ramamurthy et al. | 348/405 |
| 5,677,969 | 10/1997 | Auyeung et al. | 382/239 |
| 5,721,815 | 2/1998 | Ottesen et al. | 395/200.09 |
| 5,721,878 | 2/1998 | Ottesen et al. | 395/500 |

FOREIGN PATENT DOCUMENTS

| | | |
|---|---|---|
| WO 95 2880 | 10/1995 | WIPO . |
| WO 96 20575 | 7/1996 | WIPO . |

OTHER PUBLICATIONS

Gilge, M et al: "Motion Video Coding for Packet-Switching Networks—an Integrated Approach"; Visual Communication and Image Processing '91: Visual Communication, Boston, Nov. 11–13, 1991, SPIE vol. 1605, Nov. 11, 1991, pp. 592–603.

Reibman, A.R. et al.: "Constraints on Variable Bit-Rate Video for ATM Networks"; IEEE Transactions on Circuits and Systems For Video Technology, vol. 2, No. 4, Dec. 1, 1992, pp. 361–372.

*Primary Examiner*—Michael H. Lee
*Assistant Examiner*—Jean W. Désir
*Attorney, Agent, or Firm*—Gates & Cooper

[57] ABSTRACT

A system and method for transmitting blocks of compressed data in an ATM network is disclosed. Compressed data blocks representing a video are labeled prior to transmission with the amount of data in each block and information regarding the compression ratio of each block and the time into the video at which the block displays. A server in the system first determines the maximum amount of data that can be transmitted to the receiver's buffer and the channel between the server and receiver. Using the data block labels, the server transmits the maximum amount of data. Then, to keep the channel and buffer full of data as the receiver starts to display video, the server paces the transmission of the rest of the data. By using the label on each block of data, the server sends each block in the standard amount of time it takes to display the frame or frames represented by every block, but delayed by an amount proportional to the compression ratio for the particular block.

8 Claims, 6 Drawing Sheets

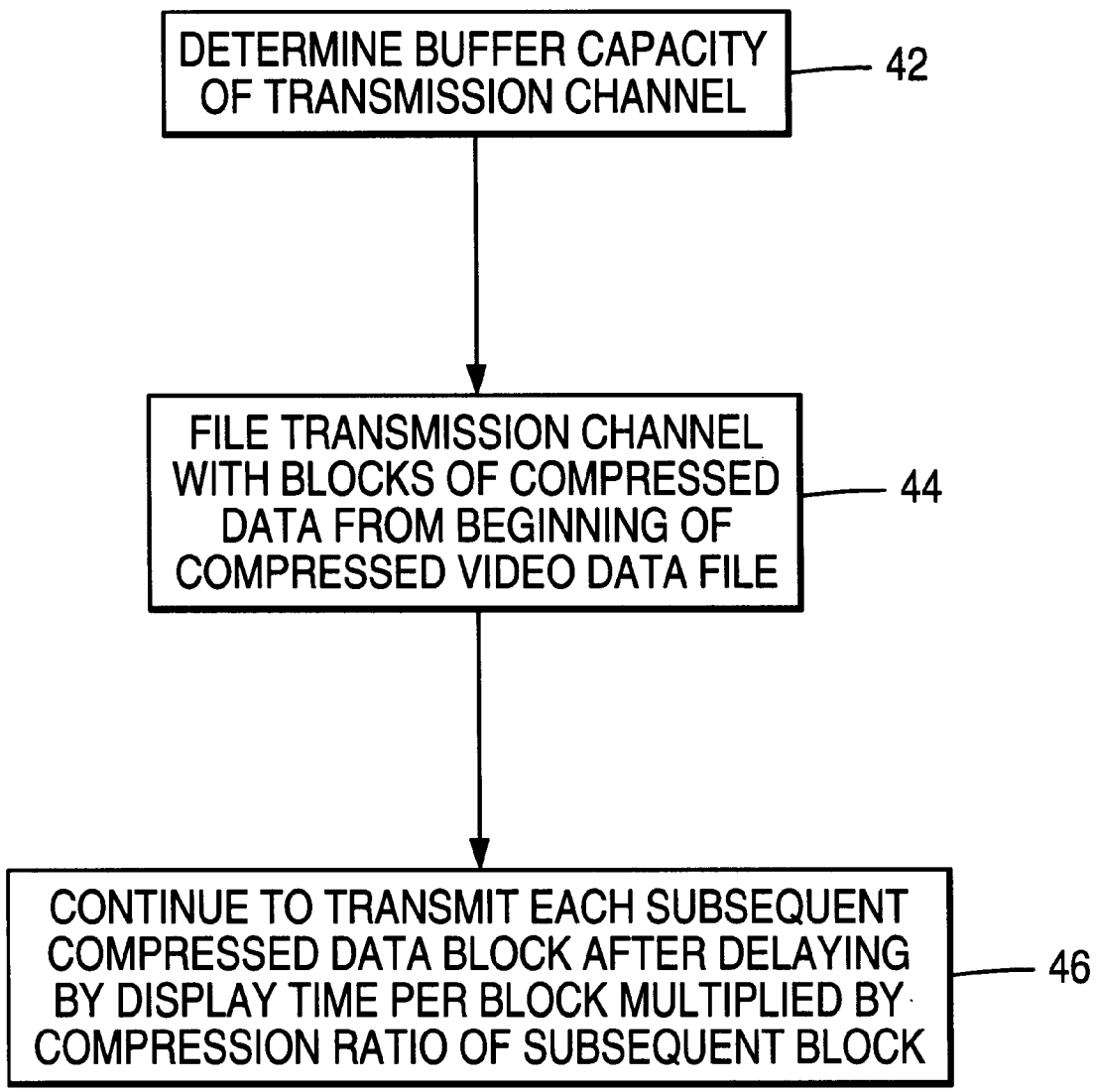

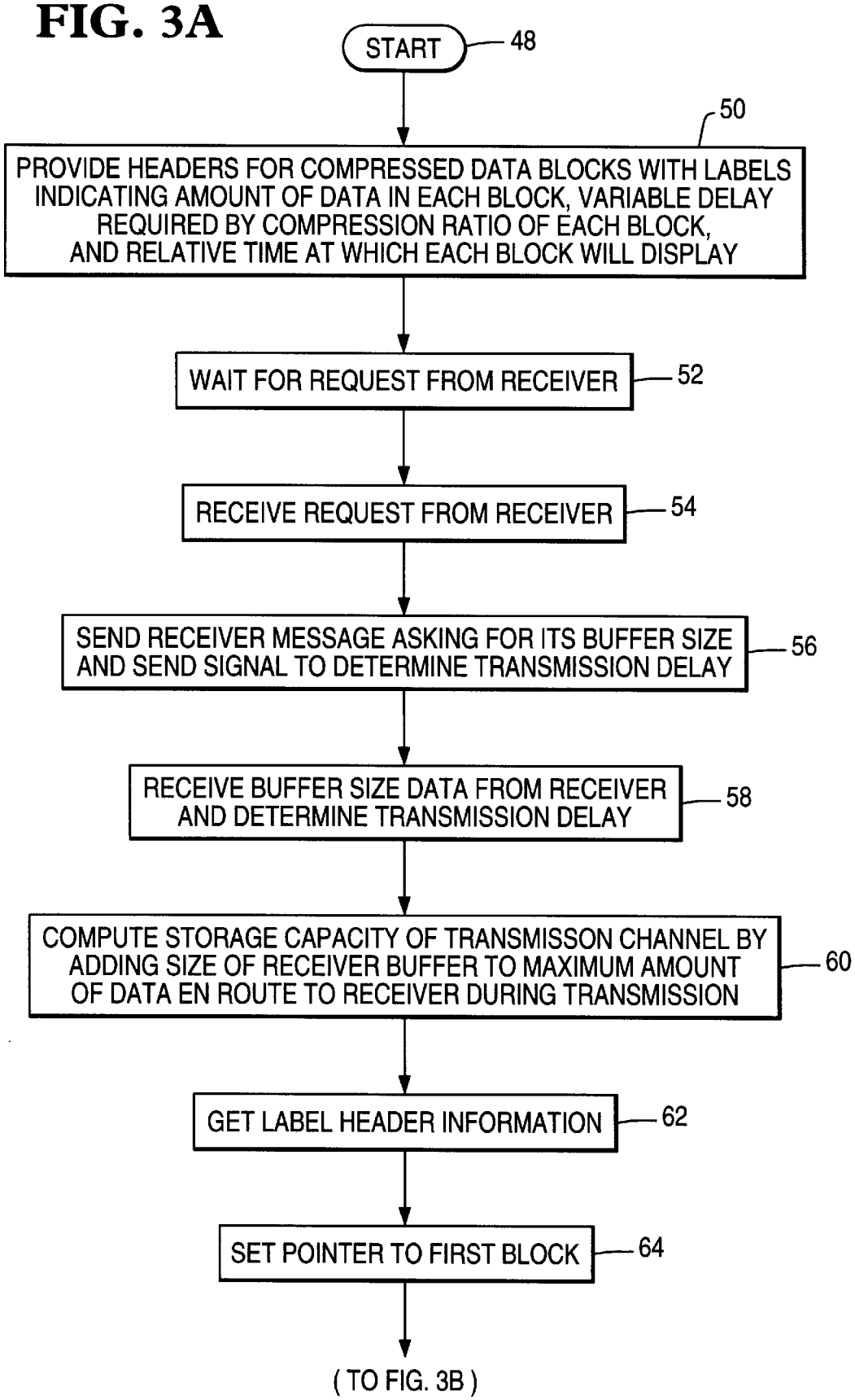

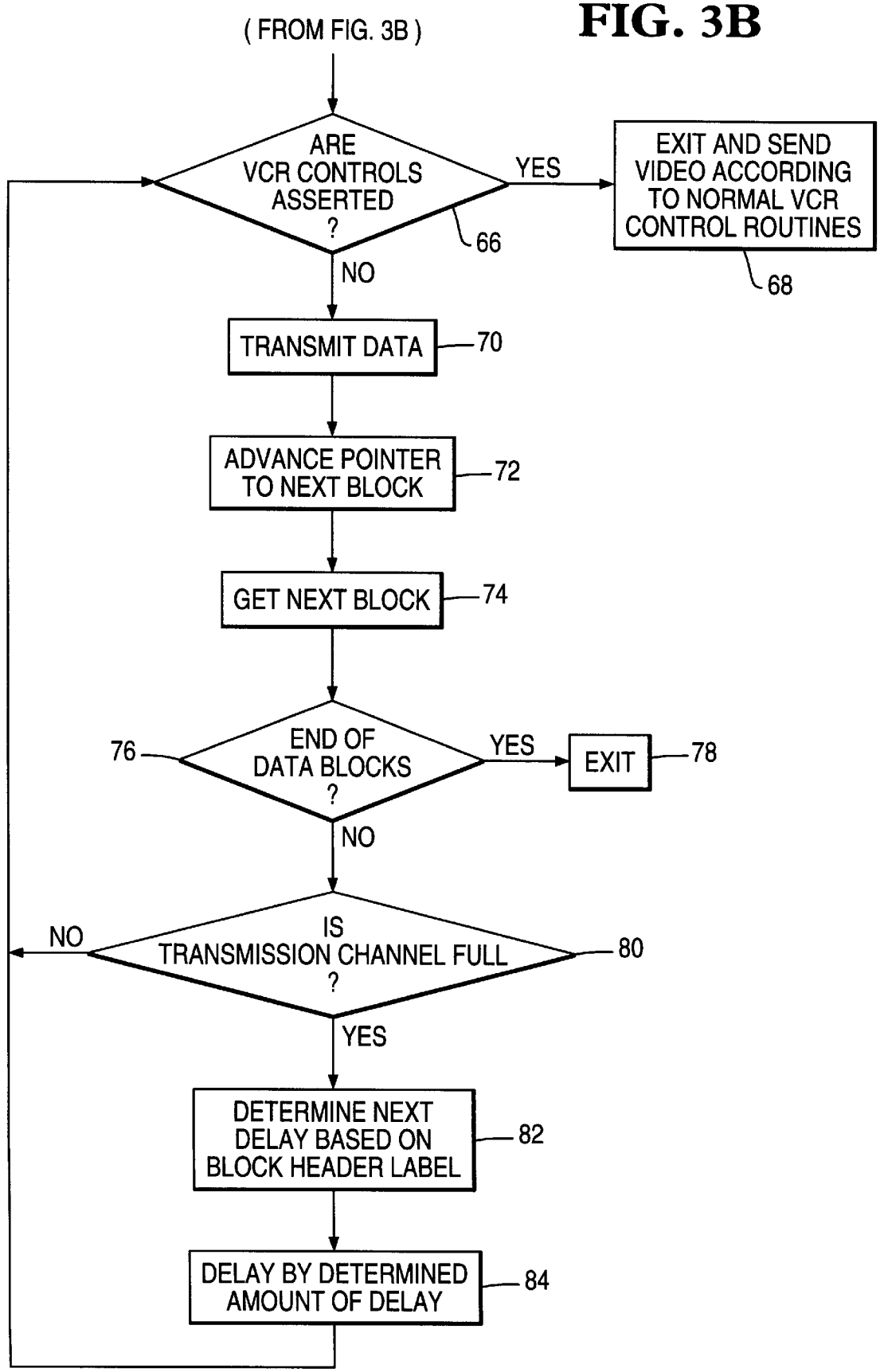

METHOD OF TRANSMITTING COMPRESSED INFORMATION TO MINIMIZE BUFFER SPACE

CROSS REFERENCE TO RELATED APPLICATION

This application is related to co-pending and commonly assigned U.S. patent application Ser. No. 08/778,937, entitled "Method Of Optimizing Bandwidth for Transmitting Compressed Video Data Streams", inventor Jukka I. Saukkonen, filed Jan. 3, 1997, which application is incorporated by reference herein.

BACKGROUND

1. Field of the Invention

This invention relates in general to systems and methods for transmitting compressed data streams, and in particular, to a system and method for pacing the transmission of compressed blocks of data from a server to a receiver that minimizes the size of the buffer required at the receiver.

2. Description of The Related Art

Recent advances in digital video and audio compression technology have created a marriage between television and personal computers. For example, it will soon be possible for a television viewer to watch a favorite video by simply downloading it to his TV through a telephone line.

Compressing the data stream that makes up such a video before sending it is desirable for two principle reasons. First, the data stream representing the video would take too long to transmit in the uncompressed state. Second, the uncompressed data stream would take up too much memory.

Different types of compression technology are currently used. However, two technology standards, MPEG and JPEG, each with its own variations, have evolved for compressing data depicting still pictures (images) and moving pictures (video), respectively.

With still image compression, transmission by a server and decompression by a receiver only has to be fast enough so that a viewer does not get bored waiting for an image to appear. But when transmitting video, a high enough frame rate has to be accomplished to produce satisfactorily smooth motion. North American television viewers are used to a rate of 30 frames per second, which means the receiver must access, decompress, and display a new image every 30–40 milliseconds. At any slower rate, the motion will seem slow or jerky.

Video compression can drastically reduce the data rate required to transmit an otherwise uncompressed data stream. For example, when a server transmits a video of a talking face, the only data that needs to be transmitted from one frame to the next is the data showing the motion of the lips, and any other features that may be moving. Therefore, after the receiver has displayed the first scene using the data for one frame, the server can represent the subsequent frames using very little data. On the other hand, when there is a sudden scene change in the video, the server needs to send the entire background without compression. If it takes too long for this data to reach the receiver, the video will not display smoothly. To adjust for these fluctuations in data transmission, receivers typically use large buffers that can store enough data before the time it is to be displayed.

Although there are several environments currently used to transmit compressed video and audio data, the environment widely recognized as being preferable is an asynchronous transfer mode (ATM) network. ATM networks transmit an encoded data stream in short, fixed-size cells of information using statistical multiplexing. According to current standards, these cells each carry only 384 bits of data. Further, the cells arrive in the same sequence in which they were transmitted. One characteristic of ATM networks is that they guarantee delivery of transmitted data at a requested bandwidth within a highly predictable delay period.

Guaranteed delivery networks such as ATM have been used to transmit video data streams compressed into blocks of data. Depending on the video compression technology used, including variations of MPEG and JPEG, each block transmitted can contain the data for displaying one frame or a small multiple of frames of video. Thus, each block can represent a constant duration of display time regardless of its length in bytes.

Although data blocks are consumed at a constant rate in blocks/second at a receiver in a guaranteed delivery network such as ATM, some blocks take longer to transmit than others because they contain more bytes. The constant rate transmission of such networks means that the amount of time it takes blocks to reach the receiver is proportional to how large they are.

Currently, transmitting condensed video or audio data over guaranteed delivery networks like ATM presents two problems. The first problem is guaranteeing continuous delivery of information for uninterrupted display of video. The second problem is determining what size buffer to use at the receiver.

Without continuous delivery, a person watching a video being transmitted will notice "outage," a momentary lack of picture or frozen frame, and "overlay," a loss of picture data when data is sent faster than it can be displayed.

A prior solution to preventing outage and overlay has been the use of a feedback loop between the receiver and server to ensure that the receiver does not run out of data or the transmitter send too much data. However, such feedback systems can be cumbersome and increase complexity of data transmission.

Another solution to preventing outage has been to use prioritizing algorithms that separate compressed video data into a high priority "base layer" and a low priority "enhancement layer." The base layer is sent first to the receiver so that it can reconstruct a minimally acceptable image. It is followed by the low priority enhancement layer, which enhances the minimally acceptable image. If congestion develops, for example because the selected bandwidth is too low or because too much data is being transmitted at one time, the data for the low priority enhancement layer is discarded. In this way, the receiver can continue to display at least a minimally acceptable image. An example of such a system for ensuring continuous image display is provided by U.S. Pat. No. 5,515,377, issued to Horne et al., and assigned to AT&T. Although prioritizing data into low and high priority categories can help avoid total loss of video, it is disadvantageous because it inherently accepts a loss of video quality.

The second problem in transmitting compressed video is determining how much buffer space is needed at the receiver to avoid outage. The required buffer size depends on the quality of picture transmitted, but may range from 1.5 to 15 Megabytes. The cost of providing memory for such buffer space in receivers can be significant, especially when the receiver is not a general purpose computer with existing memory, but a set-top box built solely for decompressing and displaying compressed video.

SUMMARY OF THE INVENTION

To overcome the difficulties described above in transmitting compressed data streams over guaranteed delivery networks, and to overcome other limitations that will become apparent upon reading and understanding the present specifications, the system disclosed herein paces transmission of blocks of compressed data representing a video segment based on how long into the video the blocks will display.

Using the high predictability of the transmission delay in guaranteed delivery networks like ATM, data blocks are sent just before they will be needed at the receiver, thereby avoiding outage and also minimizing the buffer space required at the receiver.

Thus, according to one aspect of the present invention, blocks of compressed data are labeled according to the time into the video that they will be displayed. Then, during transmission, the blocks are sent to the receiver sufficiently before the labeled display time has elapsed for the data to display on time.

According to another aspect of the present invention, the compressed data block headers include variable delay labels regarding how long to delay between transmission of consecutive data blocks. These variable delay labels are determined for each block by multiplying the compression ratio for that block by the standard display time for a block of compressed data.

According to yet another aspect of the present invention, a transmission method determines the transmission channel buffer capacity, that is, the amount of data that can be stored in the receiver's buffer plus the amount of data stored in the network in transit between the receiver and the server. The server then sends sufficient data to fill the transmission channel up to its buffer capacity. As the receiver displays video and the transmission channel begins to empty, the server continues to send data blocks according to the variable delay labels such that the transmission channel will not empty of data. Thus, the invention ensures timely delivery of video information, and at the same time reduces buffer memory requirements resulting in significant cost savings in the receiving equipment.

BRIEF DESCRIPTION OF THE DRAWINGS

Referring now to the drawings in which like reference numbers represent corresponding parts throughout:

FIG. 2 is a flow chart illustrating the functions performed by a transmission system server according to the present invention.

FIGS. 3(a) and 3(b) show a flowchart illustrating a preferred method of implementing the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
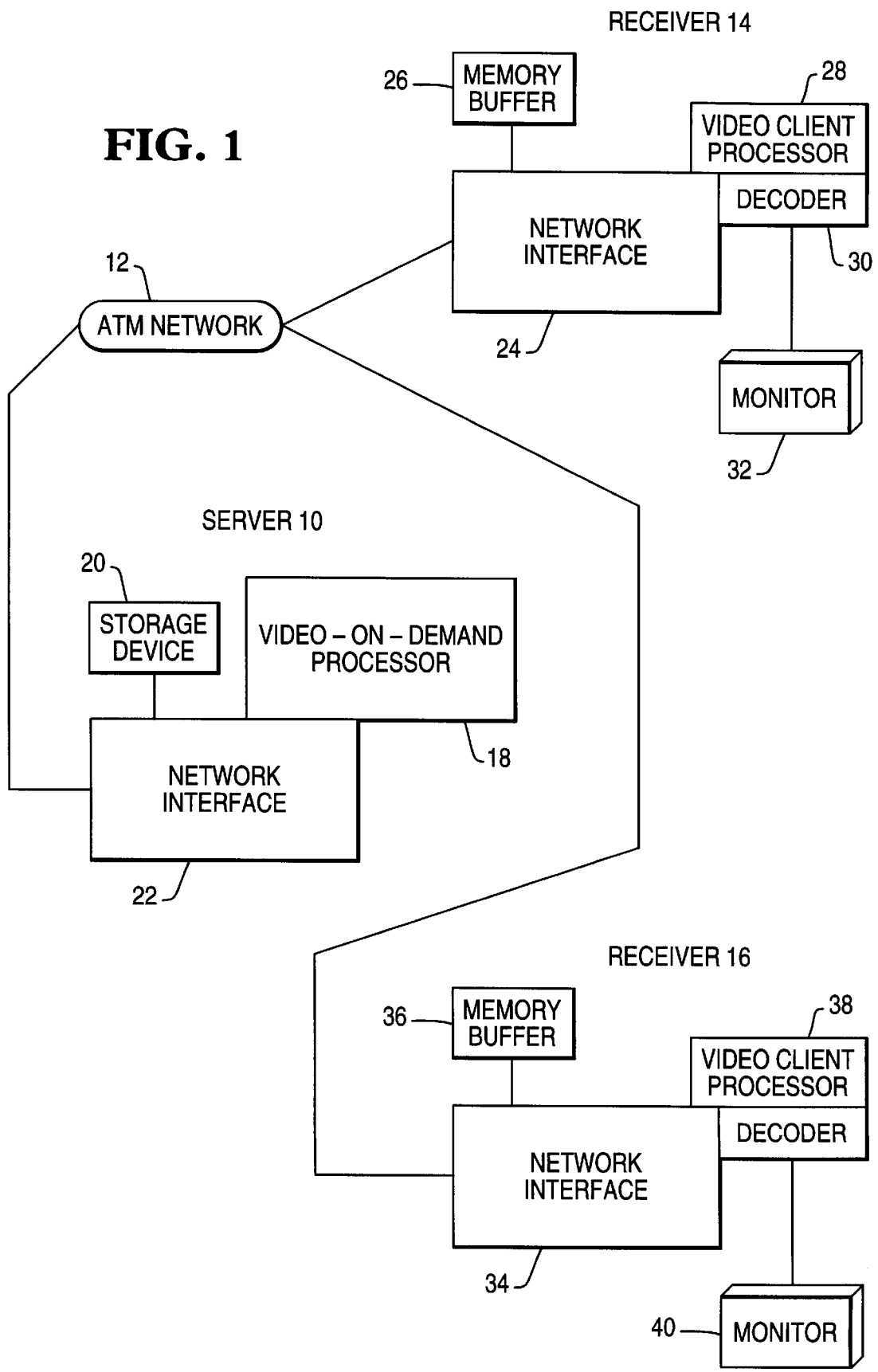
FIG. 1 represents a transmission system in which the present invention can be used.

FIG. 1 illustrates a server/client network in which the present invention may be utilized. The network includes a server 10 which connects via ATM network 12 to a plurality of receivers 14–16. Server 10 includes a video-on-demand server processor 18, which controls the operation of the storage device 20 and network interface 22. The storage device 20 may be a CD ROM or optical disc, or any other device suitable for storing compressed video data streams. The data streams do not have to be stored locally on storage device 20, but can be stored remotely as part of a remote file server that may be accessed through network interface 22 to a local area network.

It will be understood to those of ordinary skill in the art that the ATM network 12 shown in FIG. 1 is only one type of guaranteed delivery network in which the present invention may be practiced. Other networks in which the present invention may be used include those in which the delay and buffer capacity of the transmission path between the server and the receiver can be predicted such that the buffer capacity can be used as an extension of the receiver buffer. Further, it will be understood by those of ordinary skill in the art that the present invention can also be applied to transmit other types of compressed data, including compressed audio data.

According to the present invention, the compressed video data stream stored in disc 20 is formatted using headers for each block of compressed data. As discussed above, depending on the compression technology used, each block contains the data for displaying one frame or small multiple of frames of a video.

According to the preferred embodiment of the present invention, the data blocks are stored on storage device 20 with headers indicating the characteristics of the blocks. These characteristics preferably include physical block size in bytes, the required delay between transmission of consecutive blocks, and the time, relative to the beginning of a video, when the data is to be displayed. Further, at least one of the headers in the compressed video data stream file will indicate the standard display time of each block of data. For example, if each block contains data for one frame of video, then in North America, the standard display time of 1/30th of one second would be stored at least once for all the blocks in the file.

It will be appreciated by those skilled in the art that the compressed data block characteristics can be conveyed in different ways in the block headers. For example, instead of providing for each block the relative display time from beginning of the video at which it plays, a header might only identify the standard display time of each block. Then, during operation, a server can determine the relative time in a video at which a block will play by multiplying the number of the block in the compressed data stream by the standard display time for the blocks.

Further, instead of using a separate header in each data block, the compressed video stream data file may be preceded by a block map. The block map would then contain physical address of each block, the block length, compression ratio, display time relative to the start of the video, and the overall compression ratio for the compressed video data stream.

Receivers 14 and 16 use memory buffers 26 and 36, respectively, as buffers during transmission by server 10. These buffers are preferably circular, allowing storing of data at a constant bit rate and simultaneous consumption of data at a constant block rate. The amount of data in these buffers will fluctuate depending on the size of blocks being stored and consumed. According to a preferred embodiment, these buffers are supplemented by the inherent capacity of the ATM network 12 to temporarily store data.

FIG. 2 is a flow chart illustrating the functions performed by the server 10 according to the present invention. Block 42 represents the server determining the buffer capacity of the transmission channel. The transmission channel is the network 12 path in which compressed blocks of data are sent from the server 10 to the receiver 14–16, plus the buffer in the receiver 14–16. For example, the transmission channel from server 10 to client receiver 14 includes the ATM network 12 and the memory buffer 26.

Block 44 represents the server 10 filling up the transmission channel with blocks of compressed data taken from the beginning of the video stream. In particular, the server will send the amount of data required to fully load the transmission channel.

Finally, block 46 represents the server 10 completing delivery of compressed data. Having filled up the receiver 14–16 buffer with data, and having further used the network 12 as an additional buffer, the server 10 now paces the transmission of the rest of the data blocks representing the uncompressed video stream using the display time of the video itself. Because the receiver 14–16 now has enough data to begin displaying the video, the server 10 only needs to send blocks of data just in time to keep the channel from becoming empty.

It will be appreciated by those of ordinary skill in the art that the receiver 14–16 and server 10 must communicate regarding when the receiver 14–16 starts to decompress and display data. The server 10 must have this information to determine when data will be depleted from the transmission channel at the display rate of the blocks, so that it can replenish the data at the same display rate. In a preferred embodiment, the server 10 will instruct the receiver 14–16 to begin displaying as soon as the channel is full of data blocks.

Block 46 also represents the server 10 delaying before transmitting each subsequent block of data by the standard time it takes to display each block, multiplied by the compression ratio for the particular block. This amount of time is preferably identified and labeled in the header of each data block before transmission begins. For example, a data block may represent one frame of displayed video, which normally displays in 1/30th of one second. If that data block has been compressed to one-half its uncompressed size, it can be transmitted in half the amount of time required for an uncompressed block. Thus, the corresponding variable delay for this block is 1/60th of one second. This information is stored in the header for that block, and it is used to delay transmission of the block by 1/60th of a second so that the transmission channel is kept full when another block at the receiver 14–16 side displays in 1/30th of a second.

The steps discussed above can be understood more fully with reference to FIGS. 3(*a*) and 3(*b*), which together are a flow chart further illustrating the functions performed by the server 10 according to the present invention.

Block 48 represents the server 10 and receiver 14–16 initializing communication with each other. Block 50 represents the server 10 labeling the compressed blocks of data with headers, including information regarding block size in bytes and variable delay for each block. In a preferred embodiment, Block 50 will precede Block 48, such that these two pieces of header information are stored in the data blocks when they are initially formatted, for example, in optical discs.

Block 52 represents the server waiting for a request for video transmission from the receiver, and block 54 represents its receiving the request. Block 56 represents the server 10 sending the receiver a message asking for its buffer size, and also sending a signal to the receiver 14–16 to determine the transmission delay between the receiver 14–16 and the server 10. Block 58 represents server 10 receiving the buffer size from the receiver 14–16. It also represents the server 10 receiving a signal back from the receiver 14–16, from which, the server 10 will determine the transmission delay based on how long it took to receive the signal. In ATM networks 12, this transmission delay will be constant during the operation of the server 10 and receiver 14–16 within very small variations.

Block 60 represents the server computing the amount of data needed to fill the receiver 14–16 buffer and the transmission channel. For example, if a buffer can store 100 kilobytes of memory, and the transmission channel can store 10 kilobytes, then the amount of data needed is 110 kilobytes. To prevent overflow, standard jitter in the ATM network 12 is preferably considered in determining the maximum amount of data needed to fill the channel.

Block 62 represents the server 10 obtaining the label header information for the compressed data blocks. Block 64 further represents the server 10 setting the pointer to the first data block representing the data stream so that transmission can begin.

Block 66 represents the server 10 determining, before beginning transmission, whether VCR controls in the receiver 14–16 have been asserted. If they have, the server 10 exits the transmission routine and sends video data according to prior art methods, which may result in acceptable disruption of transmission or display while the VCR controls are executed.

Block 70 represents the server 10 transmitting the block of data to which it pointed in Block 64, if VCR controls have not been asserted. It should be noted that the server 10 will preferably transmit data at the highest possible bandwidth the ATM network 12 will allow so that the receiver 14–16 buffer, however small, can constantly be kept full. Block 72 represents the server 10 advancing to the next block of data, and Block 74 represents the server 10 obtaining that data. Block 76 represents the server 10 determining whether all the data blocks have been sent. If this is the case, the server 10 exits the loop at block 78.

Block 80 represents the server 10 determining whether the transmission channel is full of data. Here, the server 10 must compare the maximum amount of data that can be stored in the transmission channel with the amount of data it has already sent but which has not yet displayed. The server 10 preferably uses the labels corresponding to the display time of each block and information from the receiver 14–16 regarding when display started to keep track of this information. For example, if the server 10 has sent blocks of data up to the block that is labeled "36:33:00", and the receiver has already been playing for exactly 36 minutes, then only the last 33 seconds of video are stored in the channel. The number of bytes in these 33 seconds of video can be looked up using the block labels, and then compared with the transmission channel buffer capacity to determine if the channel is full. When the server 10 begins transmitting video, it will usually take several passes through the first part of the loop from Blocks 66 to 80 in order to transmission channel buffer capacity.

When the server 10 at Block 80 determines that the transmission channel is full, it is ready to pace the transmission of the rest of the data blocks at the maximum bandwidth the system allows. The server 10 will delay transmission of each block by the variable delay of each block, at Blocks 82 and 84. Then, at Block 66, the server 10 determines again if VCR controls have been asserted, and if not, transmits the block at Block 70. This process continues until the data block have all been sent to the receiver 14–16, so that the server 10 ends transmission at block 78.

Figure 4:
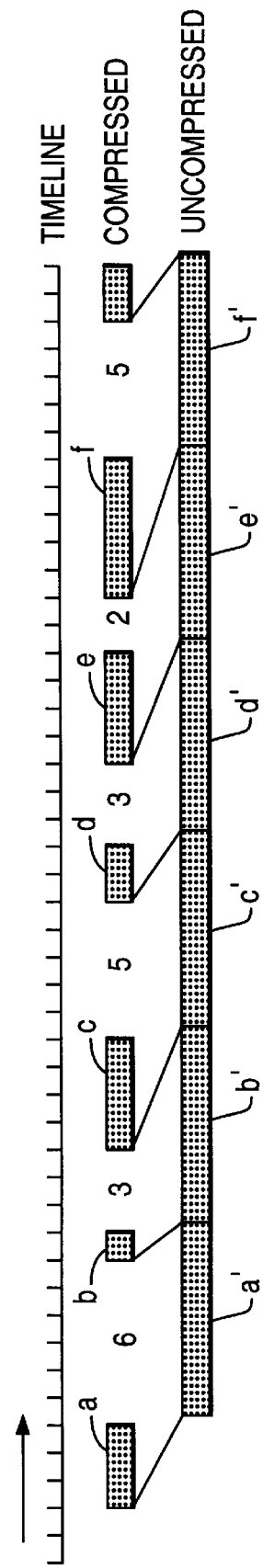
FIG. 4 is a timeline illustration of pacing transmission of data blocks using a variable delay according to the present invention.

FIG. 4 is a block diagram that further illustrates the concept of variable delay between transmission of compressed data blocks after the transmission channel has already been filled. The time line shows the time at which the video plays back after being decompressed. The compressed data line (a–f) illustrates where each compressed block of data fits in the time line. For example, compressed data block a will be received by the transmission channel and, later displayed by the receiver, as uncompressed block a'. Depending on the compression technology, block a will represent either one frame or some small series of frames of video. After sending block a into the transmission channel, the server will wait six time measurement units before sending block b. Block b, which represents uncompressed block b', contains only 1/7th the amount of bytes in block b'. Therefore, block b can be sent to the receiver in 1/7th the amount of time that it takes for the receiver to display the uncompressed block of data b'. Accordingly, after block a is sent to the receiver, the server can wait for six time measurement units before transmitting block b. If each block of uncompressed data represents one frame of video, or 1/30th of a second of display time, then the server will wait 6/7 times 1/30th of a second before sending block b.

As can be seen from the entire time line in FIG. 4, the effect of delaying transmission of video blocks by the variable delay based on the compression ratio of each block is equivalent to sending an uninterrupted transmission of uncompressed video byte stream shown by blocks a', b', c', d', e' and f' in exactly the time that it takes the receiver to display these blocks. Because the variable delay between these compressed blocks of data is used, the transmission channel will always receive only as much data, as measured by video display time, as is being consumed by the receiver at the other side. It is therefore not necessary to have a large buffer to account for unpredictable transmissions of data or to prevent outage or overflow.

Figure 5:
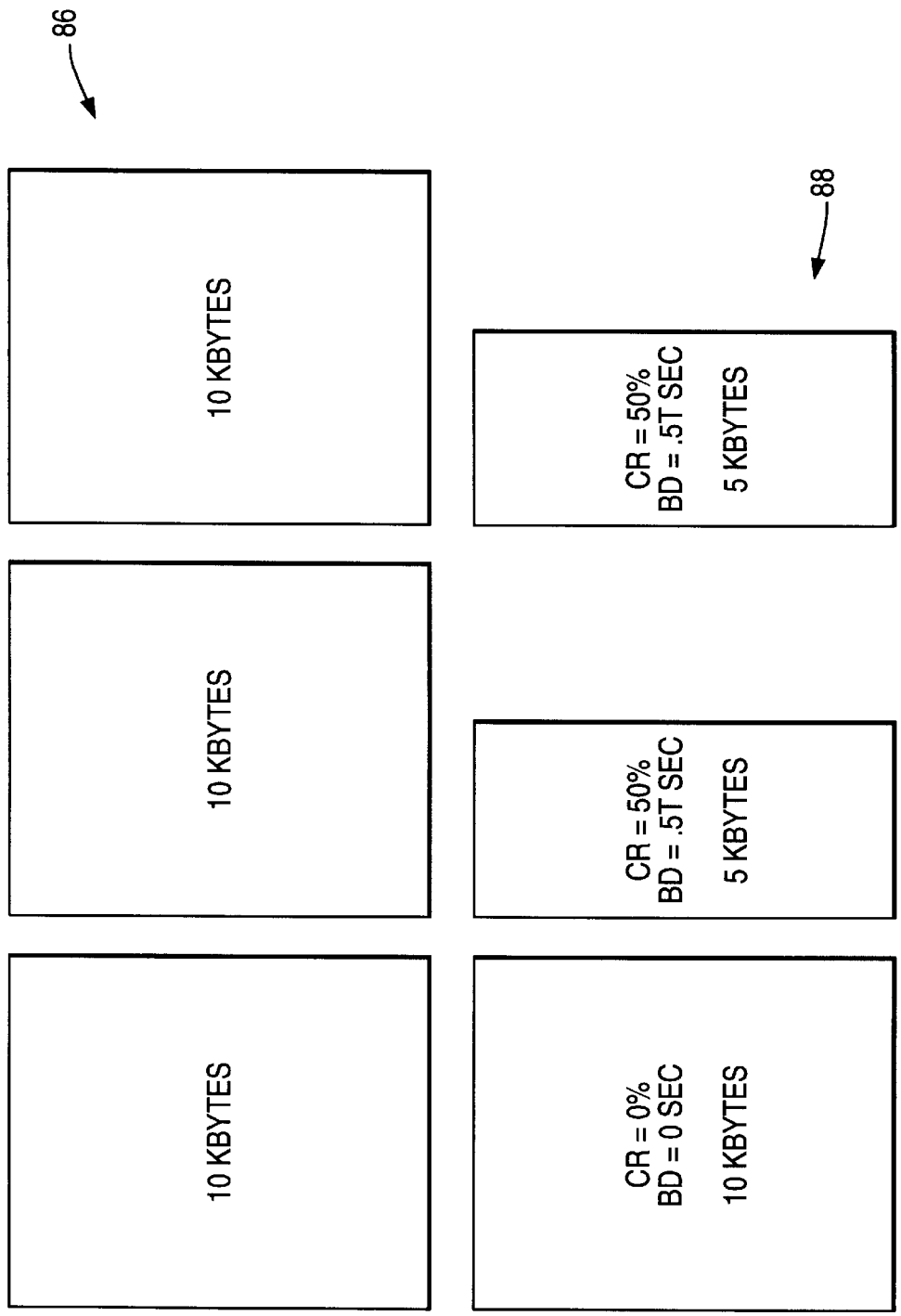
FIG. 5 illustrates the types of labels that can be stored in headers for compressed data blocks according to a preferred embodiment of the invention.

Finally, FIG. 5 is a block diagram that further illustrates the labels that can be contained in the header of data blocks according to the preferred embodiment of the present invention. The blocks labeled 86 represent uncompressed data blocks, each containing ten kilobytes of data in this example. The blocks labeled 88 are the blocks compressed by a compression ratio CR from blocks 86. Because the first block in FIG. 5 has not been compressed at all, the compressed block corresponding to it carries a delay label of 0 seconds. The second block carries a delay label of 0.5T seconds, which, if the block represents one frame of video, is 1/60th of a second in North America. As can be seen from FIG. 5, the variable delay label is a measure of compression ratio of each block. Further, each block carries the header containing the number of bytes it contains so that the server can determine whether it has sent enough data to initially fill the transmission channel to its buffer capacity.

CONCLUSION

In summary, a system and method for pacing the transmission of compressed blocks of data has been described which allows using a very small buffer at the receiver side of the network, and which avoids momentary loss of image. The system paces transmission using the predictability of transmission delays, and compressed block headers indicating how much data the blocks contain, how compressed they are, and how far into the video they will display. The system will preferably send enough data to fill the transmission channel, and then continue to fill the buffer as data displays at the receiver based on header information in each block.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a data transmission system including a server and a receiver, a method of transmitting compressed data blocks from the server to the receiver, wherein the compressed data blocks represent an uncompressed data stream, and each block is compressed in relation to a segment of data stream it represents by a compression ratio, comprising the steps of:

(a) determining a buffer capacity of a transmission channel between the server and the receiver;

(b) transmitting an initial sequence of the compressed data blocks substantially equal to the buffer capacity of the transmission channel; and (c) transmitting subsequent compressed data blocks following the initial sequence after delaying for an amount of time proportional to the compression ratio of each compressed block.

2. The method of claim 1, wherein the step of determining the buffer capacity of the transmission channel comprises the steps of:

(d) determining a transmission delay between the receiver and the server;

(e) using the transmission delay to calculate the maximum amount of data between the receiver and the server during transmission;

(f) determining the size of a buffer memory in the receiver; and (g) adding the maximum amount of data between the receiver and the server to the size of the buffer memory in the receiver.

3. The method of claim 1, wherein the step of transmitting an initial sequence of data blocks from the server to the receiver comprises the steps of:

(d) reading a header stored on each data block indicating number of bytes in each data block;

(e) calculating how many data blocks representing the beginning of the data stream can fit in the transmission channel buffer capacity and then sending that number of data blocks to the receiver.

4. The method of claim 1, wherein the step of transmitting each subsequent data block comprises the steps of:

(d) reading a header in a block to identify a compression ratio for that block;

(e) delaying for an amount of time proportional to the compression ratio for that block; and (f) transmitting that block.

5. A data transmission system including a server and a receiver for transmitting compressed data blocks representing an uncompressed data stream, each block being compressed in relation to a segment of data stream it represents by a compression ratio, comprising:

(a) means for determining a transmission channel buffer capacity between the server and the receiver, (b) means for transmitting an initial sequence of data blocks substantially equal to the transmission channel buffer capacity, and (c) means for transmitting each of the subsequent data blocks after delaying for an amount of time proportional to the compression ratio of each block.

6. The data transmission system of claim 5, wherein the means for determining the transmission channel buffer capacity comprises:

(d) means for determining a transmission delay between the receiver and the server;

(e) means for using the transmission delay to calculate the maximum amount of data between the receiver and the server during transmission;

(f) means for determining the size of a buffer memory in the receiver; and (g) means for adding the maximum amount of data between the server and receiver to the size of the receiver buffer memory.

7. The system of claim 5, wherein the means for transmitting an initial sequence of data blocks from the server to the receiver comprises:

(h) means for reading a header stored on each data block indicating number of bytes in each data block;

(i) means for calculating how many data blocks representing the beginning of the data stream can fit in the transmission channel buffer capacity; and (j) means for sending said number of data blocks to the receiver.

8. The system of claim 5, wherein the means for transmitting each subsequent data block comprises:

(k) means for reading a header in a block to identify a compression ratio for that block;

(l) means for delaying for an amount of time proportional to the compression ratio for that block; and (m) means for transmitting that block.

* * * * *